Figure 1:
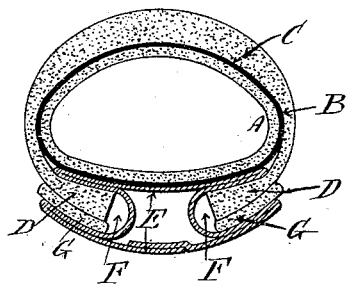

(No Model.)

C. M. LUNGREN.
PNEUMATIC TIRE.

No. 493,554.      Patented Mar. 14, 1893.

Witnesses:

Inventor:
Charles M. Lungren

UNITED STATES PATENT OFFICE.

CHARLES M. LUNGREN, OF BAYONNE, NEW JERSEY.

PNEUMATIC TIRE.

SPECIFICATION forming part of Letters Patent No. 493,554, dated March 14, 1893.

Application filed June 9, 1892. Serial No. 436,050. (No model.)

*To all whom it may concern:*

Be it known that I, CHARLES M. LUNGREN, a citizen of the United States, and a resident of Bayonne city, in the county of Hudson and State of New Jersey, have invented certain new and useful Improvements in Pneumatic Tires, of which the following is a specification.

This invention relates to pneumatic tires for bicycles and other vehicles, and has for its object an improved construction of such tires, by means of which the outer covering or shoe can be readily removed and replaced, when it is necessary to repair the inner tube on account of puncture or bursting.

The tire which forms the subject of the present application is in certain features an improvement upon that for which United States Letters Patent were granted to me September 6, 1892, No. 482,182, but which has not yet gone to issue.

In my present invention, I construct the tire of an inner closed air chamber and an outer removable shoe, the shoe being provided with enlarged edges, which edges are held in channels at the edges of the rim by removable retaining rings.

In the drawings I have shown a tire embodying the features of my invention.

Figure 2:
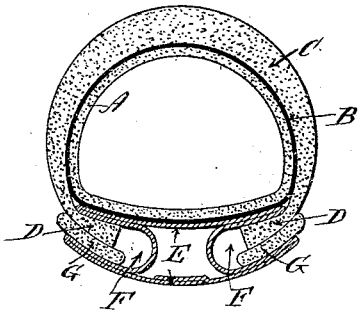

Figure 1, shows the tire deflated and Fig. 2, the same inflated, illustrating the different positions of the enlarged edges of the shoe in the rim, at these two periods.

Referring to the drawings, A is the air chamber, composed of a tube of expansible material such as rubber, and B, a non-expansible jacket. This chamber may, when desired, be composed of non-expansible material, such as rubber with a layer of canvas vulcanized in it, or of canvas rendered airtight by a solution of rubber, linseed oil, or other air proofing material, which will not destroy the flexibility of the envelope. This air chamber is inclosed in the external shoe C. This shoe is held in place on the rim by means of the thickened edges D. The rim E, is provided with channels F, at its edges, made narrower at the mouth than at the interior. The thickened edges of the shoe are shaped so that they will just pass through the mouth of the rim channels. They are, however, made tapering so that when the edges are at the extreme inner end of the rim channels there is room for the insertion of the flat rings G. These rings are simply flat washers of rubber, and when in place on the rim are under no tension or but a slight one. In putting them in place the thickened edges of the shoe are pushed clear back to the end of the rim channels, the relative position of the parts being that shown in Fig. 1. When the tire is inflated, the expansion of the air chamber forces the edges of the shoe C, outward, until the combined thickness of the taper edge of the shoe and the retaining ring G is too great to pass through the mouth of the rim channels. As the air pressure acts only on the shoe, and as the outward movement of its thickened edges brings a greater thickness of material to the narrowed mouth of the rim channels, it is evident that no strain brought to bear upon the shoe can release its edges from the rim channels, until the retaining rings are first removed.

The rim may be constructed in any desired way, the channels being formed by spaces between two concentric rims joined at the central portion, or the channels may be formed by separate strips of metal bent to shape and joined to the rim. I prefer to make it, however, in the manner shown, that is in the form of a hollow rim rolled from one piece with the channels rolled in it. This makes the rim at once light and strong, and with rounded smooth edges to the channels holding the edges of the shoe.

I claim—

1. In a pneumatic tire, the combination of an air tube or chamber, a surrounding shoe provided with enlarged edges, a wheel rim having channels at its edges to receive the edges of the shoe, and retaining rings fitting into the rim channels and serving to bind the enlarged edges of the shoe in the rim channels, substantially as specified.

2. In a pneumatic tire, the combination of a band or strip of flexible material provided with enlarged edges, a wheel rim provided with inwardly extending channels at its edges, said channels being narrower at the mouth than at the interior, and removable retaining rings adapted to fit into the rim channels and bind the enlarged edges of the tire strip in place, substantially as specified.

Signed at New York, in the county of New York and State of New York, this 4th day of June, A. D. 1892.

CHARLES M. LUNGREN.

Witnesses:
EUGENE V. MYERS,
CHARLES C. PETERS.

It is hereby certified that in Letters Patent No. 493,554, granted March 14, 1893, upon the application of Charles M. Lungren, of Bayonne, New Jersey, for an improvement in "Pneumatic Tires," an error appears in the printed specification requiring correction as follows: In lines 20-21, page 1, the clause "but which has not yet gone to issue," should be stricken out; and that the said Letters Patent should be read with this correction therein to make the same conform to the record of the case in the Patent Office.

Signed, countersigned, and sealed this 21st day of March, A. D. 1893.

[SEAL.]
CYRUS BUSSEY,
*Assistant Secretary of the Interior.*

Countersigned:
N. L. FROTHINGHAM,
*Acting Commissioner of Patents.*